United States Patent [19]

Heinzl et al.

[11] Patent Number: 4,620,201

[45] Date of Patent: Oct. 28, 1986

[54] MAGNETIC DRIVER INK JET

[75] Inventors: Joachim Heinzl, Munich; Hans-Dieter Penningsfeld, Freising; Peter Berdelle-Hilge, Munich, all of Fed. Rep. of Germany

[73] Assignee: Siemens Aktiengesellschaft, Berlin & Munich, Fed. Rep. of Germany

[21] Appl. No.: 815,922

[22] Filed: Jan. 3, 1986

[30] Foreign Application Priority Data

Jan. 14, 1985 [DE] Fed. Rep. of Germany ....... 3500985

[51] Int. Cl.[4] .............................................. G01D 15/18
[52] U.S. Cl. .............................................. 346/140 R
[58] Field of Search .................................... 346/140 R

[56] References Cited

U.S. PATENT DOCUMENTS 4,442,443 4/1984 Martner .......................... 346/140 R
4,546,361 10/1985 Brescia et al. .................. 346/140 R

*Primary Examiner*—E. A. Goldberg
*Assistant Examiner*—Gerald E. Preston
*Attorney, Agent, or Firm*—Hill, Van Santen, Steadman & Simpson

[57] ABSTRACT

For generating individual droplets, an arrangement for an ink printer device comprises conductor loops as drive elements, the middle parts thereof lying in a common ink chamber and being movable therein under the influence of a magnetic field dependent on a change of current flux through a conductor loop; the conductor loops are fashioned of webs in a terminating plate, these webs being separated by columns having capillary action; every movable middle part includes a breach which forms a discharge opening; the terminating plate combines the function of the drive elements, of the nozzle plate and of an ink tight cover of the ink printer device.

11 Claims, 7 Drawing Figures

MAGNETIC DRIVER INK JET

BACKGROUND OF THE INVENTION

1. Field of the Invention

The invention relates to an arrangement for generating individual droplets in ink printer devices having a common ink chamber for a plurality of discharge openings and a plurality of conductor loops corresponding in number to the plurality of discharge openings.

2. Description of the Prior Art

An arrangement has been proposed for ink printer devices wherein ink is ejected in the form of individual droplets wherein the drive elements in the form of conductor loops are secured at both sides of the write head, namely at both sides of an ink chamber (U.S. Pat. No. 4,544,933). A magnet system extending over the full length of the ink chamber generates a magnetic field in the region of the drive elements. A change of the current flux in a drive element due, for example, to the engagement of the current flowing through the conductor loop generates a force acting on the middle part which moves the middle part in the direction toward a discharge opening allocated to this middle part and leads to the ejection of an individual droplet. A write head can be constructed with such an arrangement wherein the advantages of an operationally reliable functioning can be combined with low outlay for the structuring and manufacture.

The manufacture of the plate containing the discharge openings, i.e. the manufacture of what is referred to as the nozzle plate, thereby presents difficulties, as does the allocation between a specific drive element and a specific discharge opening for which special adjustment or assembly operations are necessary.

SUMMARY OF THE INVENTION

The invention is based on the object of proposing a structure for a write head having a common ink chamber for a plurality of discharge openings and having a plurality of conductor loops with web portions corresponding in number to the plurality of discharge openings, the conductor loops being secured at both sides of the ink chamber and their middle parts being movable in the region of the ink chamber, and including a magnet system whose magnetic field penetrates at least the webs of the conductor loops, wherein the employment of a nozzle plate is eliminated and an involved assembly or adjustment of specific discharge openings relative to specific drive elements is no longer required.

This object is achieved by fashioning the discharge openings as breaches in the middle part of every conductor loop so that for the ejection of an individual droplet, the movable middle parts execute a movement opposite the ejection direction of an ink droplet.

BRIEF DESCRIPTION OF THE DRAWINGS

The invention shall be set forth below with reference to the drawings. Shown therein are.

DESCRIPTION OF THE PREFERRED EMBODIMENTS

Figure 1:
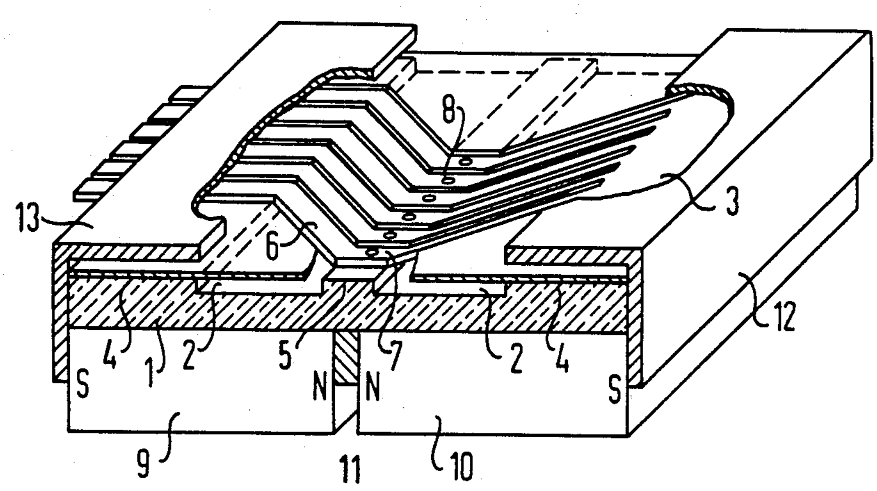
FIG. 1 is a perspective, partially cut away sectional view of an exemplary embodiment of the structure of the write head of the invention.

The exemplary embodiment of FIG. 1 shows a sectional view of a write head which is essentially composed of a base body 1 and of a terminating plate 3 which upwardly terminates the base body. The base body 1 includes lateral raised edgings 4 so that an ink chamber 2 is formed. The base body 1 can, for example, be a plastic or a glass member to whose lateral edgings 4 the terminating plate 3 composed of conductive material, is applied. This can be accomplished for example, in a galvanoplastic structuring technique. The base body 1 includes a longitudinal web 5 in the center of the ink chamber 2, the height of this longitudinal web 5 being slightly lower than the height of the lateral edging 4. The terminating plate 3 not only represents an ink-tight covering toward the outside but also forms the drive elements at the same time. These drive elements are fashioned in the form of webs 6 whose spacing, referred to as columns below, is so small that capillary effects arise. The ink is thereby prevented from flowing out given a write head which, as known, functions in accord with what is referred to as the under-pressure method. The webs 6 extend inwardly in the ink chamber 2 arrow-like, or wedge shaped, in the direction toward the longitudinal web 5 where they form a middle part 7. The webs 6 and the middle parts 7 thus form the conductor loops. Each middle part 7 includes a breach 8 which represents the discharge opening. In the exemplary embodiment of FIG. 1, the middle parts 7 do not lie directly on the surface of the longitudinal web 5 in the idle condition. Further, the webs 6 here are fashioned at the one side of the ink chamber 2 as mutually insulated and, thus, comprise individually driveable webs. The webs 6 are connected to one another at the other side of the ink chamber, i.e. they emanate from the terminating plate 3. The supply of the ink chamber 2 ensues via a supply system (not shown here) which, for example, is connected to one side of the write head at both sides of the longitudinal web 5 via a feed opening.

The structure of the write head is augmented by a magnet system which, in the example of FIG. 1, is composed of two permanent magnet members 9 and 10 whose north poles N lie opposite one another. It is advantageous when the two pole faces lying opposite one another are spaced at an interval from one another in which a soft iron part 11 is situated. The two magnet members 9 and 10 are situated below the base body 1 and extend over the full length of the write head. A compass of soft iron parts can be provided for improving the concentration of the magnetic field. This embodiment is shown in FIG. 1. Two soft iron parts 12 and 13 therein encompass the magnet members 9 and 10 as well as the base plate 1 and extend further into the upper part of the write head.

The manner of functioning of the arrangement of the invention is as follows. The ink is situated in the inside of the ink chamber 2 at both sides of the longitudinal web 5 under slight static under pressure. As known, this can be achieved in that an ink container (not shown) is located at a lower level than the write head. The ink in the ink chamber 2 also fills the breaches of discharge openings 8. When a change in the current flowing through the conductor loop occurs in a conductor loop 6, 7, this being achieved, for example, by switching the current on, then the webs 6 of the conductor loop lying in the field of the magnet system 9, 10 have a force exerted on them which very rapidly moves the middle part 7 down. This movement is limited by impact against the surface of the longitudinal web 5. The mass inertia of the ink quantity contained in the discharge opening 8 thereby leads to the ejection of the droplet which is ejected opposite the direction of movement of the middle part. The middle part 7 thereupon reassumes its idle position, whereby the discharge opening 8 is again filled with ink and the quantity of ink used is replenished by suction from the ink reservoir.

Figure 2:
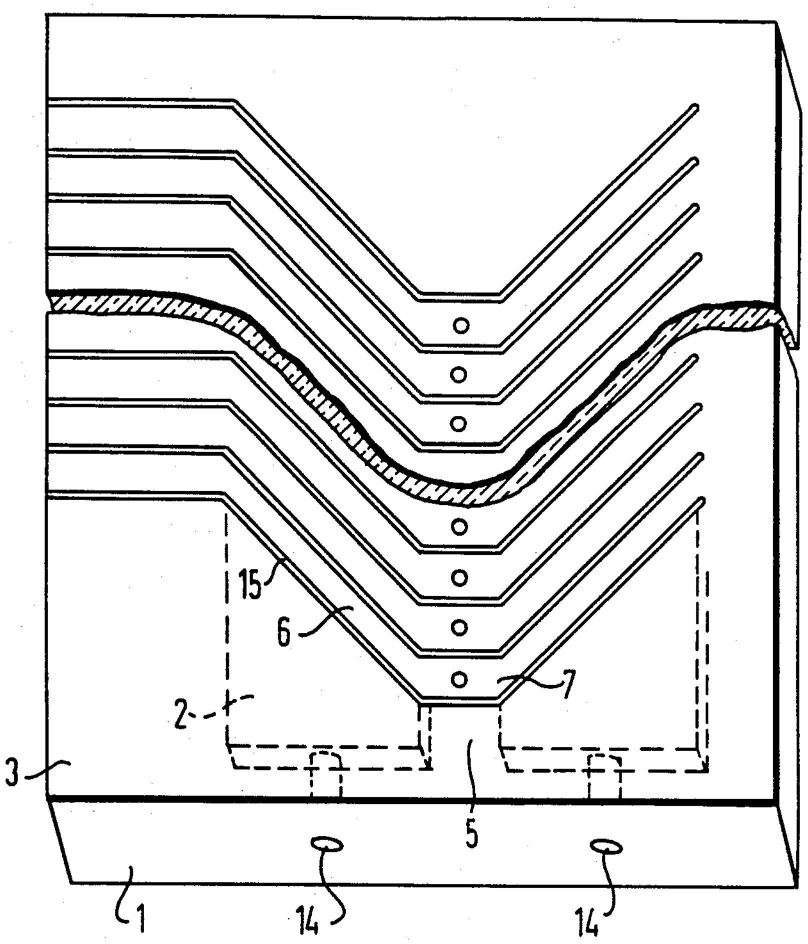
FIG. 2 is a top perspective view of a detailed example of the structure of a terminating plate.

FIG. 2 shows the base body 1 and terminating plate 3 in a plan view. The terminating plate 3 is constructed on the base body 1 and seals the latter and, thus, the ink chamber of the write head toward the outside. At the same time, however, it also represents the drive element unit with the conductor loops. Emanating from the lateral edgings 4, the webs 6 thereof extend inwardly into the ink chamber 2 arrow -like and form the movable middle parts 7 there with the discharge openings 8. The movable middle parts 7 lie above the longitudinal web 5 of the base body 1. The ink chamber is connected to an ink supply via feed openings 14. The seal of the write head by means of the terminating plate 3 is guaranteed because the columns 15 between the individual webs 6 are capillary columns. Moreover, the surface of the terminating plate 3 is, so to speak, self-cleaning since small quantitites of ink or of ink droplets which proceed to the terminated plate are suctioned back into the ink chamber due to the static under-pressure of the ink as soon as they enter into fluid contact with the ink in a column. In a practical example, these advantages are obtainable with column widths of about 20 $\mu$m.

The arrangement of the invention succeeds in creating extremely small discharge openings, this being advantageous because the ratio of ink quantity in the discharge opening to the ink in the lateral annular gap around the nozzle becomes more unfavorable with increasing length of a discharge opening and the ejection of droplets which always have the same volume and the same speed is made more difficult. Also achieved therewith is that the allocation of discharge openings to drive elements already arises during formation of the drive elements and need not be subsequently achieved by means of involved adjustment or assembly. It is also significant that the cross-talk between neighboring discharge openings is very noticeably reduced, since the stop face of the drive elements is limited to a very narrow region around the discharge openings.

This reduction of cross-talk can be promoted in accord with a further embodiment of the invention in that the movable middle parts 7 of the conductor loops rest against the surface of the longitudinal webs in their idle condition. In this case, the movable middle parts are moved out of this idle position, i.e. are moved up, upon a drive executed in the described fashion. In the following return motion into the idle position toward and against the longitudinal web 5, the small quantity of ink contained in the discharge opening is hurled away opposite the motion of the middle part as a consequence of the mass inertia of this quantity of ink and is ejected as an individual droplet.

In any case, it is essential for a good hydrodynamic efficiency that the surface of the drive element is matched to the surface of the stop face. This matching can ensue in a particularly advantageous way in that the drive elements are galvanoplastically constructed on the stop face.

Figure 4:
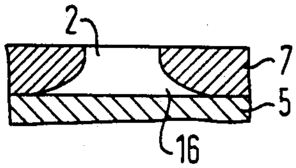
FIG. 4 is a partial side sectional view through an alternate embodiment of a conductor loop and longitudinal web.
Figure 5:
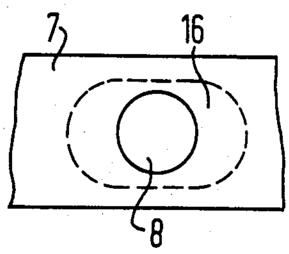
FIG. 5 is a plan view of the conductor loop shown in FIGS. 3 and 4.

A further improvement derives in that a closed cavity 16 is provided in the region around the discharge opening 8 when the middle part 7 rests on the longitudinal web 5. Two exemplary embodiments of this development are shown in FIGS. 3, 4 and 5.

Figure 3:
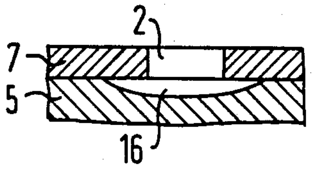
FIG. 3 is a partial side sectional view through a middle part of a conductor loop and a longitudinal web.

In the example of FIG. 3, the cavity 16 is formed by a depression in the longitudinal web 5, i.e. in the stop face. In the example of FIG. 4, the cavity 16 is formed by an expansion of the discharge opening 8, i.e. is formed in the middle part 7. As shown in FIG. 5, the cavity 16 has an oblong shape in either embodiment as shown in FIG. 3 or 4, so that a structure having very narrow middle parts is also possible in this case.

Figure 6:
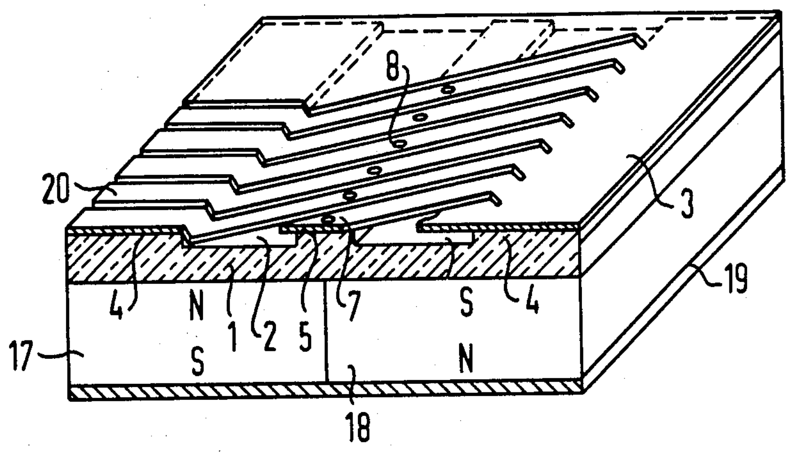
FIG. 6 is a perspective sectional view of an embodiment of the invention with which the distribution of the field line density is improved.

With the described magnet system, the movment of the middle part of a conductor loop necessary for the ejection of droplets is essentially effected by a force which acts on the legs or webs of the conductor loops. This is the case because the course of the field lines comprises two apexes which have a maximum at both sides of the middle parts. In accord with a further development of the invention, a magnet system arrangement can be employed with which what is referred to as an unapexed magnetic field is generated, with which, thus, a field line maximum is reached in the region of the middle parts. FIG. 6 shows an exemplary embodiment of this development.

The basic structure corresponds to the structure which has already been set forth, this being made clear by employing the same reference characters. There are differences with respect to the magnet system and to the geometrical shape of the conductor loops. The magnet system herein is composed of two magnet members 17 and 18 situated below the base body 1, whereby opposite pole faces N or S lie against the base body 1. At the other side (bottom), the magnet system 17, 18 is covered by a soft iron part 19. The interconnects again executed in the form of webs 20 lie stretched over the ink chamber 2. They thereby describe an angle of less than 90° with the direction of the longitudinal web 5. This is also true of the part of the web 20 in the region of the longitudinal web 5, i.e. for that part in which the discharge opening 8 is situated.

In order to increase the elasticity, the webs 20 can be angled off at one side or at both sides in the proximity of their fastening to the base body 1.

The manner of functioning of the arrangement of FIG. 6 essentially corresponds to the manner of functioning already set forth, i.e. a change in current flux in one of the webs 20 exerts a force on the web under the influence of the magnetic field which leads to a movement of the middle part and effects the ejection of a droplet from the discharge opening 8 in the fashion already set forth. In this case, a maximum of the magnetic field strength is formed above the contacting line of the two magnet members 17, 18, i.e. the maximum of the magnetic field lines penetrates the webs 20 very close in the region of the discharge openings 8. The force, which elicits a movement of the middle parts 7 of the webs 20, thus attacks immediately in the region of the discharge openings 8 in this case.

Figure 7:
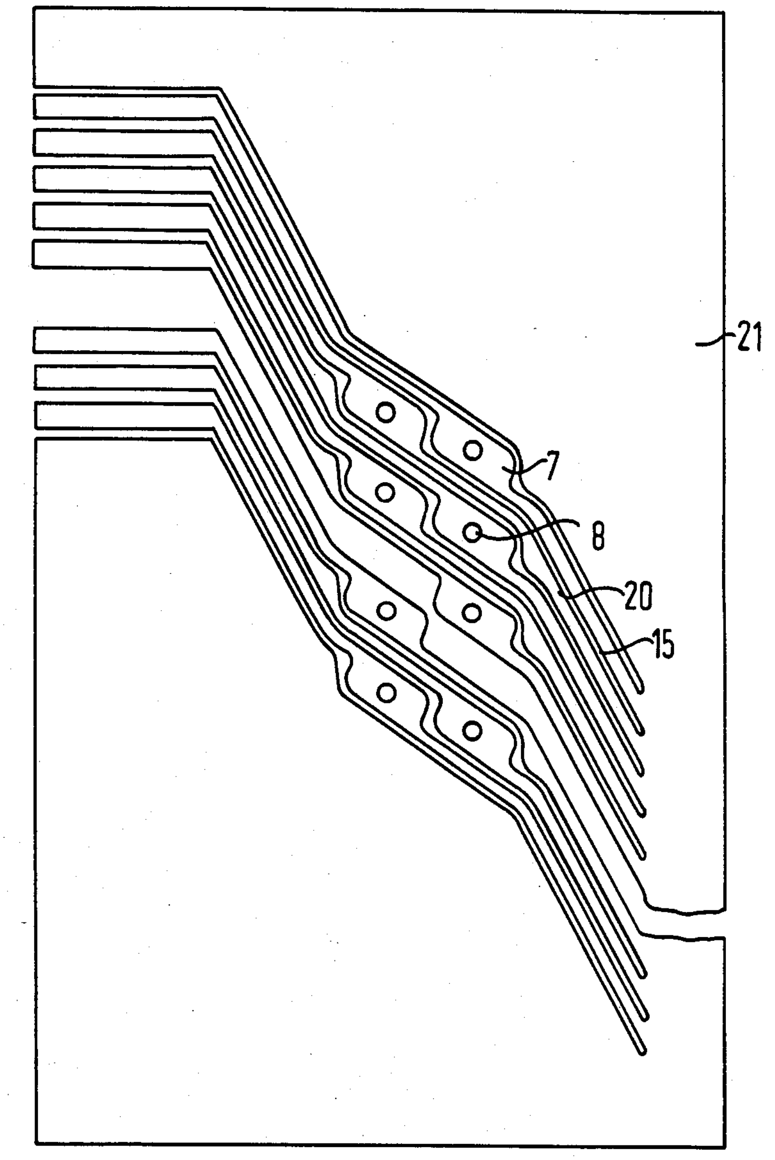
FIG. 7 is a partial plan view of an embodiment of a terminating plate having a multi-row arrangement of the discharge openings.

This development offers the advantageous possibility of a multi-rowed structure. FIG. 7 shows an example of this. The conductor loops are formed on the illustrated terminating plate 21 by the webs 20, whereby the middle parts 7 of the neighboring webs 20 form two rows in the region of the longitudinal web (not shown here). The middle part 7 of a web 20 which comprises the discharge opening 8 is thereby broadened. With this arrangement, it is also possible to arrange the discharge openings 8 mutually offset, being likewise arranged in two rows.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. An arrangement for generating individual droplets in an ink printer device, having a common ink chamber for a plurality of discharge openings, and having a plurality of conductor loops with web portions corresponding in number to the plurality of said discharge openings, said conductor loops being secured at both sides of said ink chamber and their middle parts being movable in the region of said ink chamber, and including a magnet system whose magnetic field penetrates at least the webs of said conductor loops, comprising the improvement of said discharge openings being fashioned as breaches in said middle part of every conductor loop and in that, for the ejection of an individual droplet, said movable middle parts execute a movement opposite the ejection direction of an ink droplet.

2. An arrangement according to claim 1, wherein said conductor loops are fashioned in the form of webs of a terminating plate which are separated by columns, said terminating plate being composed of conductive material and being constructed on a base body; in that said webs extend arrow-like into said ink chamber formed by lateral edgings of said base body and form said movable middle part therein; and in that said base body includes a longitudinal web in the region of said middle parts.

3. An arrangement according to claim 1, wherein said webs are insulated from one another at one side of said ink chamber and are connected to one another at the other side thereof.

4. An arrangement according to claim 2, wherein the height of said longitudinal web is somewhat lower than the height of said lateral edging and in that in the idle condition, said middle parts are situated at a slight distance from the surface of said longitudinal web.

5. An arrangement according to claim 2, wherein the height of said longitudinal web corresponds to the height of said lateral edging and in that, in the idle condition, said middle parts lie against the surface of said longitudinal web.

6. An arrangement according to claim 4, wherein the seated condition of said moved middle part against the surface of said longitudinal web, a closed cavity is provided between said two parts in the region around said discharge opening and in that said cavity is fashioned by an expansion in said moved middle part and/or by a depression in said longitudinal web.

7. An arrangement according to claim 1, wherein said magnet system is arranged below said base body in that a soft iron is provided between the two pole faces of said magnet system which lie opposite one another; and in that said magnet system, said base body, and said terminating plate are partially encompassed by further soft iron parts.

8. An arrangement according to claim 1, wherein said conductor loops are formed by webs proceeding in elongated fashion and including said discharge opening in the region of said ink chamber in that said webs form an angle of less than 90° with a longitudinal web arranged at said base body in the region of said discharge openings and in that said magnet system generates an unapexed magnetic field whose field line density comprises a maximum in the region of those parts of said webs comprising said discharge openings.

9. An arrangement according to claim 8, wherein said webs are angled at one or at both sides immediately before entering into said ink chamber.

10. An arrangement according to claim 8, wherein part of said webs comprising said discharge openings is fashioned broadened; and in that the shape of said broadening is such that a plurality of mutually offset rows of discharge openings are formed.

11. An arrangement according to claim 8, wherein said magnet system is composed of two magnet members which are situated below said base body and whose opposite pole faces lie next to one another in one plane; and in that the pole faces facing away from said base body are covered by a soft iron part.

* * * * *